(12) United States Patent
Masuda

(10) Patent No.: US 9,082,548 B2
(45) Date of Patent: Jul. 14, 2015

(54) POROUS CAPACITORS AND METHOD FOR MANUFACTURING THE SAME

(71) Applicant: Taiyo Yuden Co., Ltd., Tokyo (JP)

(72) Inventor: Hidetoshi Masuda, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 93 days.

(21) Appl. No.: 13/752,940

(22) Filed: Jan. 29, 2013

(65) Prior Publication Data

US 2013/0201604 A1    Aug. 8, 2013

(30) Foreign Application Priority Data

Feb. 3, 2012 (JP) ................................. 2012-022287

(51) Int. Cl.
*H01G 4/01* (2006.01)
*H01G 4/30* (2006.01)
*H01G 4/018* (2006.01)
*H01G 13/06* (2006.01)
*H01G 9/048* (2006.01)

(52) U.S. Cl.
CPC ................ *H01G 4/01* (2013.01); *H01G 4/018* (2013.01); *H01G 4/302* (2013.01); *H01G 9/048* (2013.01); *H01G 13/06* (2013.01)

(58) Field of Classification Search
CPC .......... H01G 4/01; H01G 4/302; H01G 4/018
USPC ................................................. 361/303, 311
See application file for complete search history.

(56) References Cited

U.S. PATENT DOCUMENTS

| 2,939,059 | A  | * | 5/1960  | Gravley ........................ 361/321.2 |
| 6,532,143 | B2 | * | 3/2003  | Figueroa et al. ........... 361/301.4 |
| 7,312,975 | B2 | * | 12/2007 | Togashi et al. ............. 361/321.1 |
| 7,903,387 | B2 | * | 3/2011  | Masuda et al. ................ 361/303 |
| 2007/0097596 | A1 | * | 5/2007 | Kuwajima et al. ............ 361/311 |
| 2009/0195963 | A1 | * | 8/2009 | Masuda et al. ................ 361/312 |
| 2012/0250220 | A1 | * | 10/2012 | Yamashita et al. ......... 361/321.2 |

FOREIGN PATENT DOCUMENTS

| JP | 09266130     | A | * | 10/1997 |
| JP | 2001110673   | A | * | 4/2001  |
| JP | 2009-088034  |   |   | 4/2009  |

OTHER PUBLICATIONS

Machine translation of JP2011-110673A dated Apr. 20, 2011 to Tanaka.

* cited by examiner

*Primary Examiner* — David M Sinclair
(74) *Attorney, Agent, or Firm* — Pillsbury Winthrop Shaw Pittman LLP

(57) ABSTRACT

One object is to provide a porous capacitor having an improved mechanical strength and a method of manufacturing the porous capacitor. In accordance with one aspect, the porous capacitor has a first conductor layer a second conductor layer opposed to each other at a certain distance, a dielectric layer made of an oxidized valve metal and disposed between the first conductor layer and the second conductor layer, a large number of holes in the dielectric layer substantially orthogonal to the first conductor layer and the second conductor layer, first and second electrodes made of a conductive material filled in the holes, insulators for electrically insulating the first electrodes from the second conductor layer and the second electrodes from the first conductor layer, wherein the levels of the ends of the first and/or second electrodes electrically insulated from the second and/or first conductor layers are uneven with each other.

5 Claims, 11 Drawing Sheets portion D   portion C

POROUS CAPACITORS AND METHOD FOR MANUFACTURING THE SAME

CROSS-REFERENCE TO RELATED APPLICATIONS

This application is based on and claims the benefit of priority from Japanese Patent Application Serial No. 2012-22287 (filed on Feb. 3, 2012), the contents of which are hereby incorporated by reference in their entirety.

TECHNICAL FIELD

The present invention relates to a porous capacitor and a method for manufacturing the porous capacitor, and particularly to an improved porous capacitor having increased capacitance and a method for manufacturing the improved porous capacitor.

BACKGROUND

As a related art of the present invention, Japanese Patent No. 4493686, for example, discloses a porous capacitor in which a plurality of substantially columnar holes are formed in a dielectric layer provided between a pair of conductor layers opposed to each other at a predetermined interval, an electrode material is filled in these holes to form first electrodes and second electrodes, the first electrodes are electrically connected only to one of the conductor layers, and the second electrode is electrically connected only to the other conductor layer.

FIG. 11 is a structural diagram of the porous capacitor of the related art. In this figure, a porous capacitor 1 is configured as follows: a dielectric layer 4 is interposed between a pair of conductor layers (hereinafter referred to as the first conductor layer 2 and the second conductor layer 3) opposed to each other at a predetermined distance; a large number of holes 5 orthogonal to the first conductor layer 2 and the second conductor layer 3 and having a substantially straight tubular shape are formed in the dielectric layer 4; an electrode material is filled in these holes 5 to form first electrodes 6 and second electrodes 7; the first electrodes 6 are electrically connected only to one of the conductor layers (the first conductor layer 2); and the second electrodes 7 are electrically connected only to the other conductor layer (the second conductor layer 3).

The porous capacitor 1 of the related art has a large number of electrodes (the first electrodes 6 and the second electrodes 7) formed in the porous dielectric layer 4, the electrodes being connected selectively to the first conductor layer 2 and the second conductor layer 3. This arrangement increases the area of the electrode plate and thus increases the capacitance without increasing the size of the capacitor.

SUMMARY

As described above, the related art provides the advantage of being able to increase the capacitance without increasing the size of the capacitor. However, a study made by the present inventors has revealed that the related art needs to be improved in terms of the mechanical strength of components.

In FIG. 11, a plurality of first electrodes 6 are connected to the first conductor layer 2 while being insulated from the second conductor layer 3, with the insulated ends being substantially even at a level (La). Likewise, a plurality of second electrodes 7 are connected to the second conductor layer 3 while being insulated from the first conductor layer 2, with the insulated ends being substantially even at a level (Lb). This arrangement of the porous capacitor 1 of the related art produces mechanically weak parts near these levels (La, Lb).

More specifically, the mechanical strength of the porous capacitor 1 is attained only by the dielectric layer 4 disposed between a pair of conductor layers (the first conductor layer 2 and the second conductor layer 3). As described above, the ends of the plurality of first electrodes 6 and the ends of the plurality of second electrodes 7 insulated from the conductor layers (the first conductor layer 2 or the second conductor layer 3) are substantially even at respective levels (La, Lb). Therefore, cracking tends to occur linearly in the dielectric layer 4 along these levels (La, Lb) defined by boundary surfaces and reduces the mechanical strength. Thus reduced mechanical strength of the porous capacitor 1 causes the dielectric layer 4 to be broken along the levels defined by boundary surfaces due to, for example, a mechanical impact in the mounting operation, a thermal impact in soldering, or a thermal stress in high temperature application, resulting in insufficient insulation that reduces the product reliability.

The present invention has been accomplished to overcome these problems; and an object of the invention is to provide a porous capacitor having increased mechanical strength and a method for manufacturing the porous capacitor.

A porous capacitor according to an embodiment of the present invention comprises: a first conductor layer; a second conductor layer opposed to the first conductor layer at a certain distance; a dielectric layer disposed between the first conductor layer and the second conductor layer, the dielectric layer being made of an oxidized valve metal and having a large number of holes substantially orthogonal to the first conductor layer and the second conductor layer; first electrodes made of a conductive material filled in at least part of the large number of holes, the first electrodes being electrically connected to the first conductor layer and insulated from the second conductor layer, with levels of insulated ends of the first electrodes being uneven with each other within a certain range; and second electrodes made of a conductive material filled in at least part of the large number of holes, the second electrodes being electrically connected to the second conductor layer and insulated from the first conductor layer. A method of manufacturing a porous capacitor according to an embodiment of the present invention is a method of manufacturing a porous capacitor having a dielectric layer made of an oxide substrate obtained by anodically oxidizing a metal substrate, the method comprising the steps of: applying a voltage to a metal substrate for anodic oxidation to obtain an oxide substrate, while forming, in a direction of a thickness of the oxide substrate, a plurality of first holes opened only at a front surface, or a primary surface, of the oxide substrate and a plurality of second holes opened both at the front surface of the oxide substrate and at a back surface opposed to the front surface; forming a seed layer on the front surface of the oxide substrate such that the seed layer provides varied electrical resistivities for the first and second holes in electrolytic plating for forming electrodes in the first and second holes; forming an appropriate amount of plating conductor at ends of the second holes proximate to the front surface of the oxide substrate; providing openings to the first holes at the back surface of the oxide substrate; embedding a plating conductor in both the first holes and the second holes, thereby forming first electrodes in the first holes and second electrodes in the second holes; removing a back of the oxide substrate so as to expose the second electrodes on the back surface of the oxide substrate; forming a second conductor layer on the back surface of the oxide substrate such that the second conductor layer provides varied electrical resistivities for the second electrodes; removing the seed layer formed on the front surface of the oxide substrate; performing electrolytic etching on ends of the second electrodes on the front surface of the oxide substrate such that levels of the ends of the second electrodes are uneven with each other; and forming a first conductor layer on the front surface of the oxide substrate.

Various embodiments of a porous capacitor of the present invention are free of mechanically weak levels defined by boundary surfaces, and thus have increased mechanical strength.

DESCRIPTION OF EXAMPLE EMBODIMENTS

Figure 1:
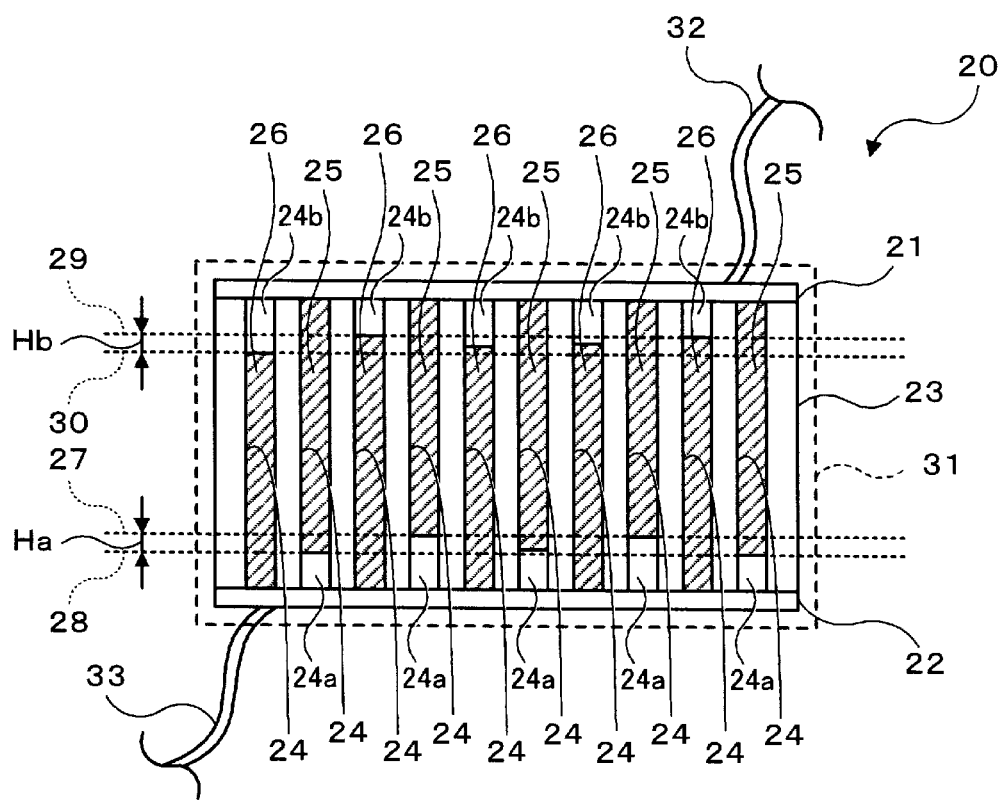
FIG. 1 is a schematic diagram showing a porous capacitor according to an embodiment.

Embodiments of the present invention will be described below with reference to the accompanying drawings. FIG. 1 is a schematic diagram of a porous capacitor according to an embodiment. A porous capacitor 20 of the embodiment is configured as follows: a dielectric layer 23 is interposed between a pair of conductor layers (hereinafter referred to as the first conductor layer 21 and the second conductor layer 22) opposed to each other at a predetermined distance; a large number of holes 24 orthogonal to the first conductor layer 21 and the second conductor layer 22 and having a substantially straight tubular shape are formed in the dielectric layer 23; an electrode material is filled in these holes 24 to form first electrodes 25 and second electrodes 26, the first electrodes 25 are electrically connected only to one of the conductor layers (the first conductor layer 21); and the second electrodes 26 are electrically connected only to the other conductor layer (the second conductor layer 22).

The first electrodes 25 are insulated from the second conductor layer 22 via spaces 24a, and the second electrodes 26 are likewise insulated from the first conductor layer 21 via spaces 24b. These spaces 24a and 24b are provided so as to electrically connect the first electrodes 25 only to one of the conductor layers (the first conductor layer 21) and the second electrodes 26 only to the other conductor layer (the second conductor layer 22). That is, the spaces 24a and 24b serve as insulators to make such selective connections.

In a porous capacitor 20 of the embodiment, the ends of the first electrodes 25 and/or the second electrodes 26 which are not connected to the conductor layers, or are insulated therefrom, are not even with each other. That is, the ends of the plurality of first electrodes 25 (facing the spaces 24a) are not even with each other; and the ends of the plurality of second electrodes 26 (facing the spaces 24b) are not even with each other.

In FIG. 1, a broken line 27 indicates the level of the end of the shortest one of the plurality of first electrodes 25 insulated from the second conductor layer 22. A broken line 28 indicates the level of the end of the longest one of the plurality of first electrodes 25 insulated from the second conductor layer 22. Ha represents the distance between the broken lines 27 and 28, or the difference in length between the first electrodes 25. Likewise, a broken line 29 indicates the level of the end of the longest one of the plurality of second electrodes 26 insulated from the first conductor layer 21. A broken line 30 indicates the level of the end of the shortest one of the plurality of second electrodes 26 insulated from the first conductor layer 21. Hb represents the distance between the broken lines 29 and 30, or the difference in length between the second electrodes 26.

Thus, one of the features of the porous capacitor 20 of the embodiment is that the ends of the first electrodes 25 (facing the spaces 24a as insulators) are made uneven with each other in a range of the distance Ha, and likewise, the ends of the second electrodes 26 (facing the spaces 24b as insulators) are made uneven with each other in a range of the distance Hb.

Making the levels of the ends of the electrodes varied and uneven in a certain range reduces the tendency of cracking in the dielectric layer 23 along the ends of the electrodes. That is, this arrangement increases the mechanical strength and restrains the dielectric layer 23 from breaking along the levels of the boundary surfaces of the electrodes due to a mechanical impact in a mounting operation, a thermal impact in soldering, or a thermal stress in a high temperature application. Thus, higher reliability of products is achieved.

Examples of preferred materials of the components are as follows. The first conductor layer 21 and the second conductor layer 22 may be made of most metals (such as Cu, Ni, Cr, Ag, Au, Pd, Fe, Sn, Pb, Pt, Ir, Rh, Ru, or Al). The dielectric layer 23 may be made of an oxidized valve metal (such as Al, Ta, Nb, Ti, Zr, Hf, Zn, W, or Sb); and the first electrodes 25 and the second electrodes 26 may be made of most metals usable for plating (such as Cu, Ni, Co, Cr, Ag, Au, Pd, Fe, Sn, Pb, or Pt) or an alloy thereof.

In the illustrated structure, spaces 24a are provided on the ends of the first electrodes 25, and likewise spaces 24b are provided on the ends of the second electrodes 26, in order to electrically connect the first electrodes 25 only to one of the conductor layers (the first conductor layer 21) and the second electrodes 26 only to the other conductor layer (the second conductor layer 22). The present invention, however, is not limited to this embodiment. Essentially, insulation is required between the first electrodes 25 and the second conductor layer 22 and between the second electrodes 26 and the first conductor layer 21. For example, the spaces 24a and 24b may be filled with any insulator (including a dielectric material).

With such a structure, the porous capacitor 20 as a whole is covered with an insulating film 31 (exterior protection material) and is connected to external electrodes (not shown) through lead wires 32 and 33 drawn out from openings provided in this insulating film 31. The insulating film 31 may be made of, for example, SiO2, SiN, a resin, or a metal oxide, with a thickness of the order of tens of nanometers to tens of micrometers.

The present invention is not limited to the arrangement of the embodiment wherein the levels of the ends of the plurality of first electrodes 25 are uneven and the levels of the ends of the plurality of second electrodes 26 are also uneven. The effects of the present invention can be achieved even if only either one of the first or second electrodes are arranged such that the ends thereof are uneven with each other.

Figure 2:
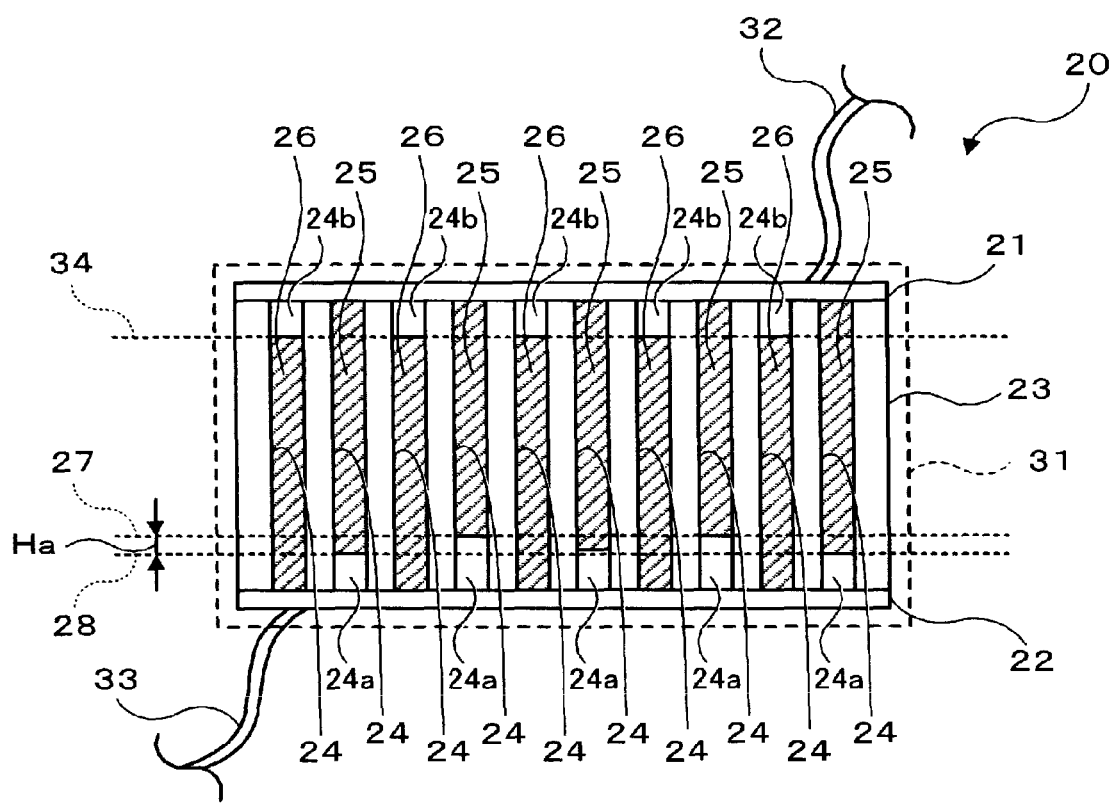
FIG. 2 is a schematic diagram showing a variation example of the embodiment.

FIG. 2 is a schematic diagram showing an embodiment wherein the levels of the ends of the plurality of first electrodes 25 are uneven, while the levels of the ends of the plurality of second electrodes 26 are uniformed at a level (denoted by a broken line 34). FIG. 2 contains the same reference numerals denoting the same components as FIG. 1. As shown in FIG. 2, the mechanical strength of the porous capacitor 20 can be increased only by varying the levels of the ends of either one of the first electrodes or the second electrodes.

Figure 3A:
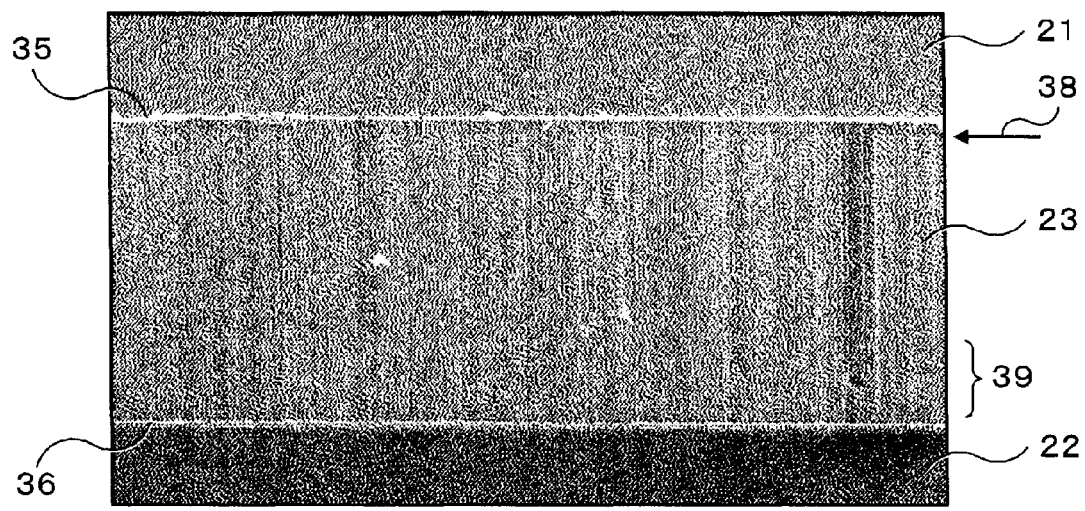
FIGS. 3A and 3B show the specific structure of the variation example.
Figure 3B:
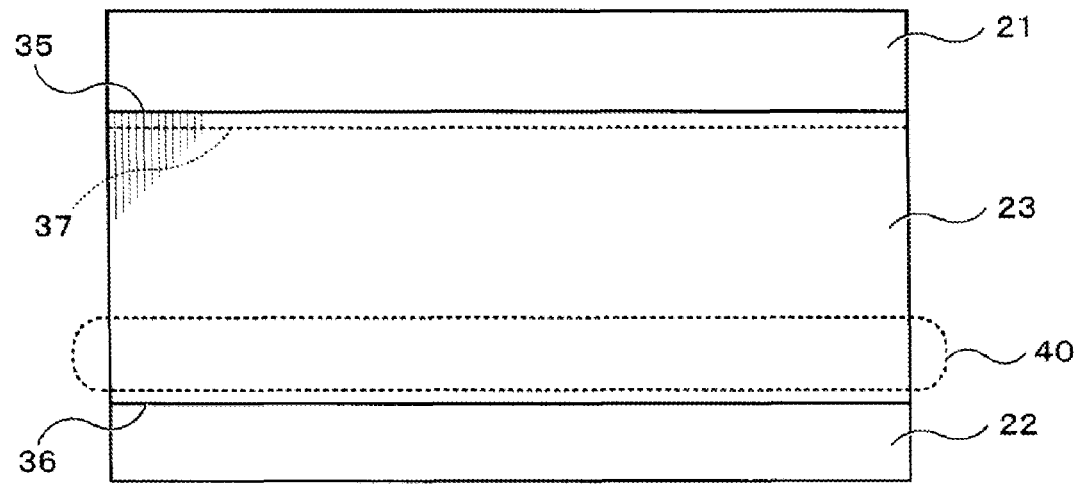

FIGS. 3A and 3B are diagrams showing a specific structure wherein the levels of the ends of either one of the first electrodes or the second electrodes are uneven. FIG. 3A is a microphotograph of a section of the porous capacitor 20. FIG. 3B is a diagram illustrating the microphotograph. In FIGS. 3A and 3B, fine vertical stripes are observed in the dielectric layer 23 placed between a pair of conductor layers (the first conductor layer 21 and the second conductor layer 22). Each of these vertical stripes is a hole 24. The holes 24 each contain a first electrode 25 or a second electrode 26; and as described above, the levels of the ends of the plurality of first electrodes 25 are uneven, while the levels of the ends of the plurality of second electrodes 26 are uniformed (see a broken line 37).

In FIGS. 3A and 3B, a solid line 35 represents a boundary line between the first conductor layer 21 and the dielectric layer 23; and a solid line 36 represents a boundary line between the second conductor layer 22 and the dielectric layer 23. A broken line 37 in FIG. 3B corresponding to the broken line 34 in FIG. 2 represents the (uniformed) level of the ends of the second electrodes 26. The microphotograph shows a vague white line (see the portion indicated by an arrow 38) at the level corresponding to the broken line 37. The "vague white line" shown in FIG. 3A corresponds to the level of the boundary surfaces having a low mechanical strength.

In contrast, as described above, the levels of the ends of the first electrodes 25 are uneven and therefore are not shown in a definite line (boundary). An area 39 of the microphotograph shown in FIG. 3A (corresponding to the area in FIG. 3B enclosed with a broken line 40) does not contain such "a vague white line." Thus, at least the area 39 of the microphotograph shown in FIG. 3A (corresponding to the area in FIG. 3B enclosed with a broken line 40) does not contain uniformed boundary surfaces having a low mechanical strength.

In this variation example, the levels of the ends of the first electrodes 25 are uneven, while the levels of the ends of the second electrodes 26 are uniformed (see the broken line 34 in FIG. 2 or the broken line 37 in FIG. 3B). This arrangement may be inverted. That is, the levels of the ends of the first electrodes 25 may be uniformed while making the levels of the ends of the second electrodes 26 uneven. This arrangement likewise increases the mechanical strength.

Next, the manufacturing process will be described below. FIGS. 4 to 8 are manufacturing process diagrams. The steps will be described in order.

Figure 4A:
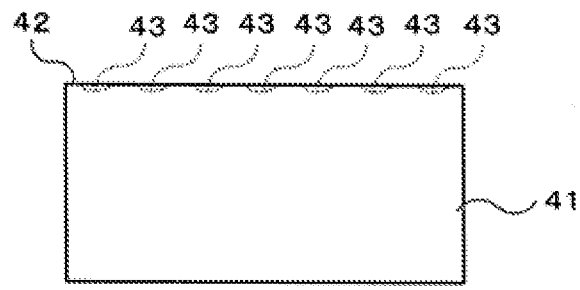
FIG. 4 is a manufacturing process diagram (1/3).

<Step Shown in FIG. 4A>

First, a substrate 41 made of the above mentioned valve metal such as aluminum is prepared; and the substrate 41 is provided, in the surface 42 forming the primary surface, with pits 43 for subsequent anodic oxidation (a technique for electrolytically oxidizing a metal forming an electrode) in a hexagonal closest packing arrangement. The pits can be formed by urging an object made of a substance harder than the substrate 41.

Figure 4B:
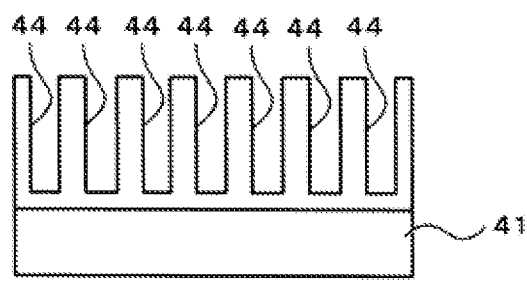

<Step Shown in FIG. 4B>

Next, a predetermined low voltage (hereinafter referred to as the first voltage) is applied to the substrate 41 to perform a low-voltage anodic oxidation, thereby forming a large number of holes 44 having a certain depth (a certain length) in the direction of the thickness of the substrate 41 (the vertical direction of the figure). These holes 44, which will finally be the holes 24 in FIG. 2, do not yet have the shape of the holes 24 at this stage; therefore, these holes 44 will be referred to as rough holes 44 for distinction from the holes 24.

Figure 4C:
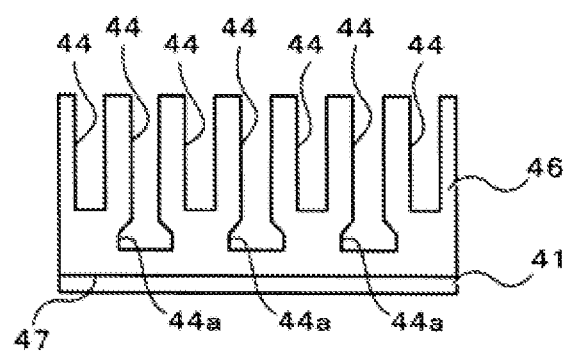

<Step Shown in FIG. 4C>

Next, a voltage higher than the first voltage (hereinafter referred to as the second voltage) is applied to the substrate 41 to perform a high-voltage anodic oxidation, thereby further deepening some of the rough holes 44 and forming diameter-expanded portions 44a at the bottoms of the deepened rough holes 44. Hereinafter, the rough holes 44 not having diameter-expanded portions 44a and the rough holes 44 having diameter-expanded portions 44a will be referred to as shallow rough holes 44 and deep rough holes 45, respectively, for distinction from each other.

The shallow rough holes 44 and the deep rough holes 45 are ideally arranged alternately. Practically, these rough holes may be arranged randomly. Additionally, the pitch between holes formed by the anodic oxidation (the intervals between the rough holes) increases with the applied voltage; therefore, the deep rough holes 45 formed by the higher voltage (the second voltage) occur a larger pitch. The pitch can be adjusted by adjusting the voltage.

The conditions of the anodic oxidation, in an oxalate solution of 0.1 mol/l at 15° C. for example, is as follows: the first voltage ranges from several voltages to several hundred voltages; the process time with the first voltage ranges from several minutes to several days; the second voltage is several times as high as the first voltage; and the process time with the second voltage ranges from several minutes to several ten minutes. More specifically, a first voltage of 40 V provides shallow rough holes 44 at a pitch of about 100 nm, and a second voltage of 80 V provides deep rough holes 45 at a pitch of about 200 nm.

Further, a second voltage in the above range (several times as high as the first voltage) provides the substantially the same number of deep rough holes 45 as the shallow rough holes 44. Thus, in the steps described below, substantially the same number of first electrodes 25 formed in the shallow rough holes 44 and the second electrodes 26 formed in the deep rough holes 45 can be arranged randomly, thereby efficiently providing the power. Further, the process time with the second voltage in the above range (several minutes to several ten minutes) minimizes the thickness of the oxide substrate 46 to be formed in the step of FIG. 4C. This oxide substrate 46 is preferably as thin as possible, because the unnecessary portion thereof is to be removed in the subsequent step.

Figure 4D:
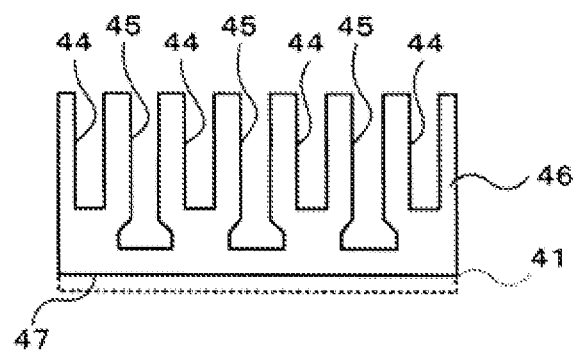

<Step Shown in FIG. 4D>

Next, the base metal of the substrate 41 (unoxidized portion) is removed with an appropriate technique such as wet etch (a technique for removing a film by a chemical reaction using a chemical agent solution) so as to expose a back 47 of the oxide substrate 46.

Figure 4E:
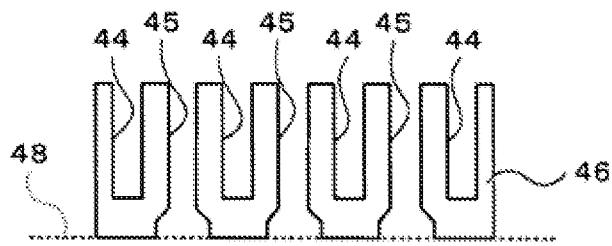

<Step Shown in FIG. 4E>

Next, the back of the oxide substrate 46 is removed along the broken line 48 with an appropriate technique such as reactive ion etching (RIE), thereby forming openings in the bottom surface of the deep rough holes 45 on the back 47 of the oxide substrate 46.

Figure 5A:
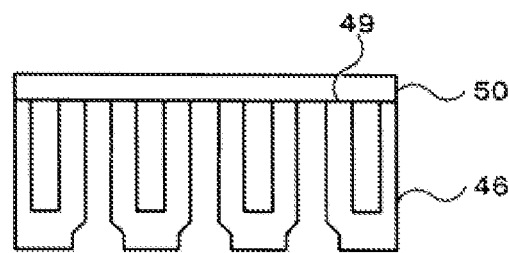
FIG. 5 is a manufacturing process diagram (2/3).

<Step Shown in FIG. 5A>

Figure 6:
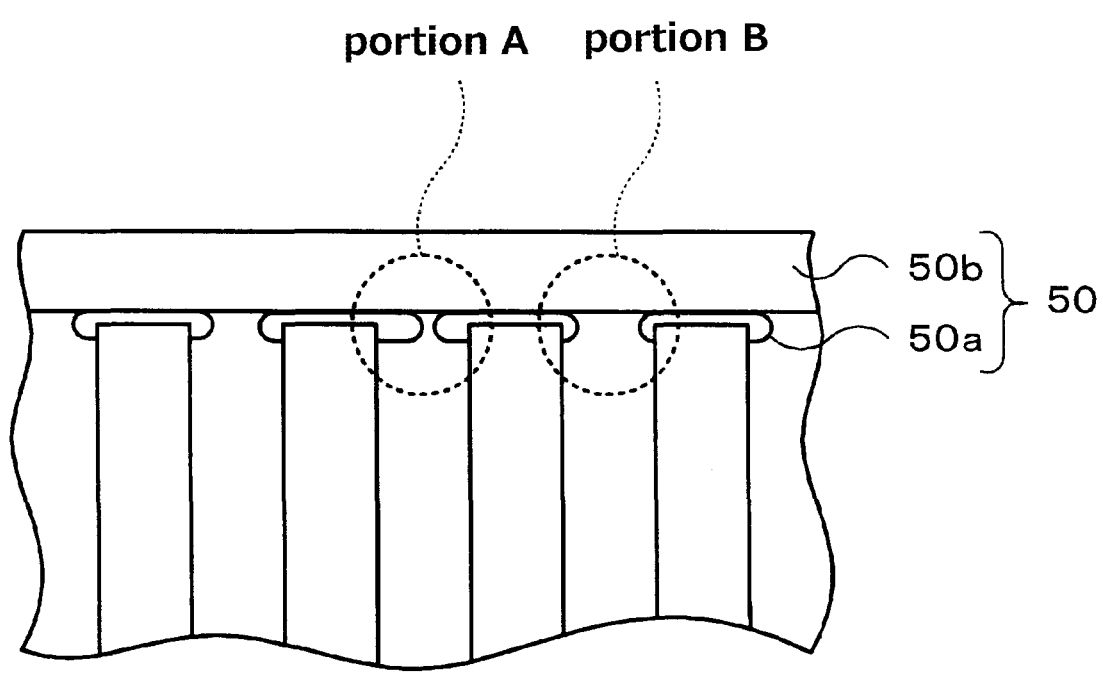
FIG. 6 shows an enlarged seed layer 50.

Next, a seed layer 50 made of a conductor is formed on a surface 49 of the oxide substrate 46 with an appropriate technique such as physical vapor deposition (PVD). FIG. 6 shows an enlarged seed layer 50. The seed layer 50 comprises two metal layers formed in order. The first layer is formed with a film member 50a (or film members 50a) consisting of an electrically resistive metal such as titanium or chrome, and then the second layer is formed on the first layer with a film member 50b (or film members 50b) consisting of a metal less electrically resistive than the film member 50a such as copper. If the diameter of the holes formed is about 100 nm for example, the first layer is formed with the film member 50a in a thickness of about 45 nm which is less than half the diameter of the holes. As shown in FIG. 6, the first layer thus formed with the film member 50a almost closes some holes (portion A) and partially encircles some holes (portion B), with a random amount of the film member 50a for each hole. Then, the second layer is formed on the first layer with the film member 50b in a thickness of about 0.5 to 10 μm. Thus, the seed layer 50 is formed while retaining the shape of the first layer comprising the film member 50a. The amounts of film members, which increase with the film forming time, can be controlled by adjusting the time while observing the film forming conditions and the amounts of films under a microscope or a scanning electron microscope (SEM).

Figure 5B:
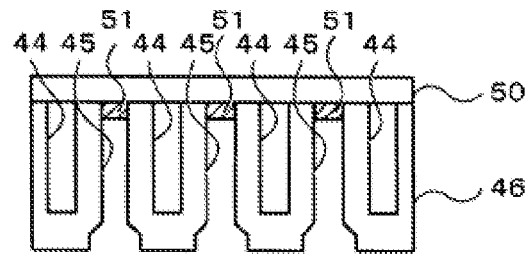

<Step Shown in FIG. 5B>

Next, an appropriate amount of plating conductor 51 is formed by electrolytic plating so as to be embedded inside the deep rough holes 45 on the seed layer 50 used as a seed layer. In this operation, the shallow rough holes 44 are closed at the ends and an electrolyte for plating is shut off; therefore, no plating conductor is formed in the shallow rough holes 44. The plating conductors 51 are formed in such an amount that, in the subsequent step, plating conductors inside the deep rough holes can be sufficiently longer than plating conductors inside the shallow rough holes.

Figure 5C:
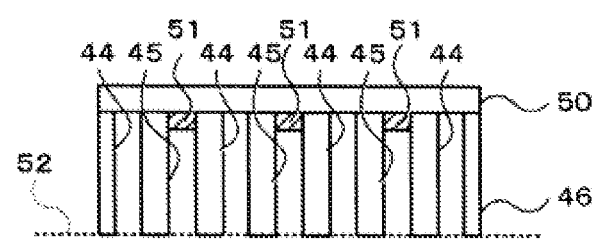

<Step Shown in FIG. 5C>

Next, the back of the oxide substrate 46 is removed along the broken line 52 with an appropriate technique such as reactive ion etching (RIE), thereby forming openings of the shallow rough holes 44 on the back of the oxide substrate 46. Since the deep rough holes 45 have already been provided with the openings on the back of the oxide substrate 46 in the preceding step, both the shallow rough holes 44 and the deep rough holes 45 have openings on the back of the oxide substrate 46 in this step. Accordingly, the shallow rough holes 44 and the deep rough holes 45 form the holes 24 in the above described embodiment (FIG. 1) and the variation example thereof (FIG. 2).

Figure 5D:
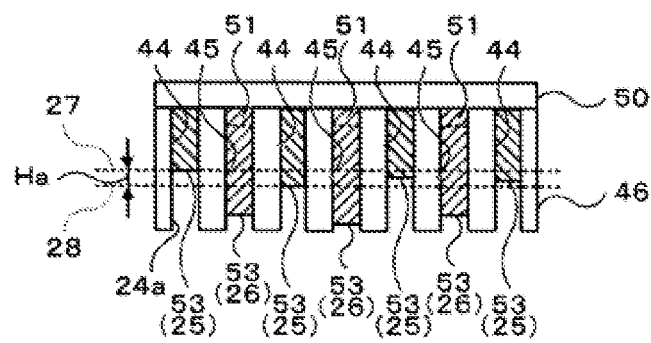

<Step Shown in FIG. 5D>

Next, plating conductors 53 are grown and formed by electrolytic plating both inside the shallow rough holes 44 and inside the deep rough holes 45 on the seed layer 50 used as a seed layer. Since the deep rough holes 45 already have the plating conductors 51 embedded therein in the preceding step, the amount of plating embedded in the deep rough holes 45 is equal to the sum of the amounts of the plating conductor 51 and the plating conductor 53. In contrast, the amount of plating embedded in the shallow rough holes 44 is equal to the amount of the plating conductor 53 only. Inside the shallow rough holes 44 are formed electrodes made of the plating conductor 53 to serve as the first electrodes 25; and inside the deep rough holes 45 are formed electrodes made of the plating conductor 51 and the plating conductor 53 to serve as the second electrodes 26. Due to the presence of the plating conductor 51 shown in FIG. 5B, all of the electrodes 26 are formed longer than the electrodes 25 toward the back surface.

The electric current for electrolytic plating is uniformly supplied from the seed layer 50; however, as shown in FIG. 6, the first layer comprising the film member 50a, having a high electrical resistivity, covers the holes in varied areas. As a result, each of the holes is interrupted by different amount of filter forming material 50a of the first layer and is provided different electrical resistivity at the end on the seed layer 50. Therefore, inside of each of the holes is supplied with different current density in electrolytic plating. In FIG. 6, portion A interrupted by a larger amount of film member 50a of the first layer is provided with a higher electrical resistivity and reduces the current density in electrolytic plating, thus reducing the rate of forming the electrode made of the plating conductor in the corresponding hole. In contrast, portion B interrupted by a smaller amount of film member 50a of the first layer is provided with a lower electrical resistivity and retains a high current density in electrolytic plating, thus allowing a high rate of forming the electrode of the plating conductor in the corresponding hole. The electrodes made of the plating conductor formed at a higher rate are formed longer than the electrodes made of the plating conductor formed at a lower rate.

The first layer is thus formed with the film member 50a so as to vary the electrical resistivity at the end of each of the holes on the seed layer 50, thereby varying the levels of the ends of the electrodes 53 shown in FIG. 5D (the first electrodes 25).

In the step shown in FIG. 5A, the following method is also available to form the first layer comprising the film member 50a so as to vary the electrical resistivity at the end of each of the holes on the seed layer 50. That is, the first layer comprising the film member 50a is formed integrally so as to close the holes with varied thicknesses of about 50 to 300 μm, thereby varying the electrical resistivity at the end of each hole.

Figure 7:
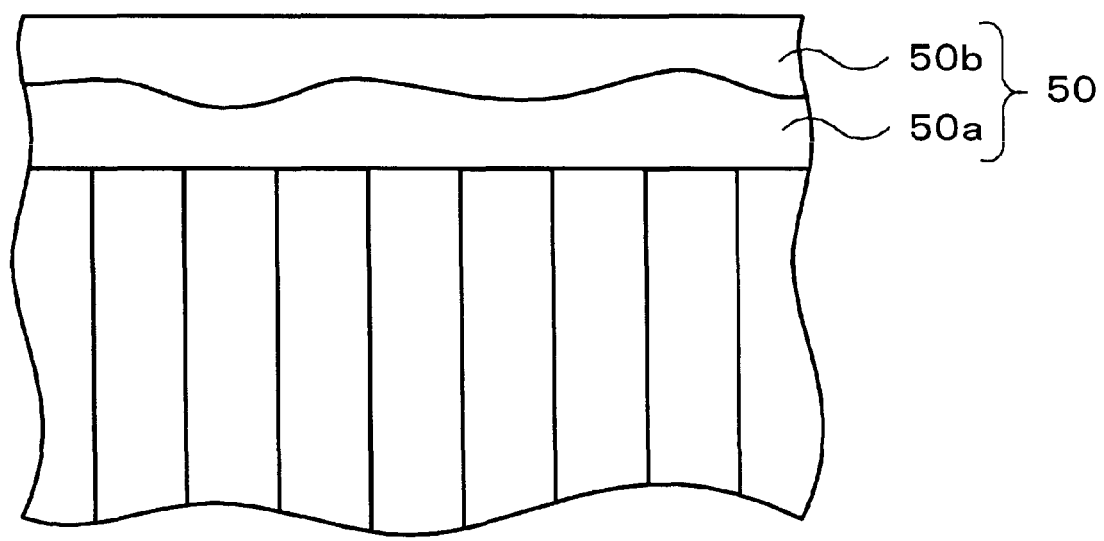
FIG. 7 is a schematic diagram showing the seed layer 50 wherein a first layer is formed with a film member 50a having a large thickness.

FIG. 7 is a schematic diagram showing the seed layer 50 wherein a first layer comprising the film member 50a is formed integrally so as to close the holes with varied thicknesses. The thickness of the first layer comprising the film member 50a is preferably 300 μm or less, because the first layer with a thickness larger than 300 μm tends to come unstuck. In this case, the seed layer 50 may have either only one layer comprising the film member 50a or two layers comprising the film members 50a and 50b, respectively.

The seed layer 50 is only required to vary the electrical resistivity at the end of each hole on the seed layer 50; therefore, the seed layer 50 may be formed in the reverse order of the first layer comprising the film member 50a and the second layer comprising the film member 50b, or the seed layer 50 may further have a third layer and a fourth layer.

Additionally, the seed layer 50 can be formed uniformly to uniform the electrical resistivity. For example, if the seed layer 50 is formed only of a less electrically resistive material such as copper so as to bridge the holes, the electrodes are formed with a uniformed length.

Additionally, the diameters of the holes may be varied to vary the electrical resistivity for each hole, that is, for each electrode. The following is a reference embodiment. If the holes in the XY section shown in FIG. 10 have varied diameters, shapes can be varied as in portion A and portion B shown in FIG. 6 and portion C shown in FIG. 9B, without controlling the conditions for forming the seed layer and the conductor layer. Varying the size of the holes results in the varied electrical resistivity of the electrode formed in each hole, making the levels of the ends of the electrodes uneven with each other. The size of the holes can be varied by, for example, performing anodic oxidation under the conditions of Examples in Table 1. As understood from Table 1, anodic oxidation at a temperature of 10° C. or below tends to largely vary the hole diameters. The mechanical strength is finally improved by the unevenness of the levels of the ends of the electrodes only when the variation, or the standard deviation an of the hole diameters is larger than 5 nm. Additionally, the mechanical strength listed in Table 1 is evaluated by heat cycle tests described below; in Table 1, "no-good" represents that one or more out of ten test samples were cracked, and "good" represents that none of ten test samples was cracked.

surfaces of the first electrodes 25, the spaces 24a having random depths within a predetermined range. Additionally, the oxide substrate 46 serves as a dielectric layer 23.

Figure 8A:
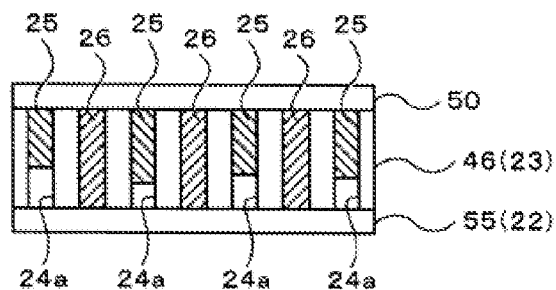
FIG. 8 is a manufacturing process diagram (3/3).

<Step Shown in FIG. 8A>

Figure 9A:
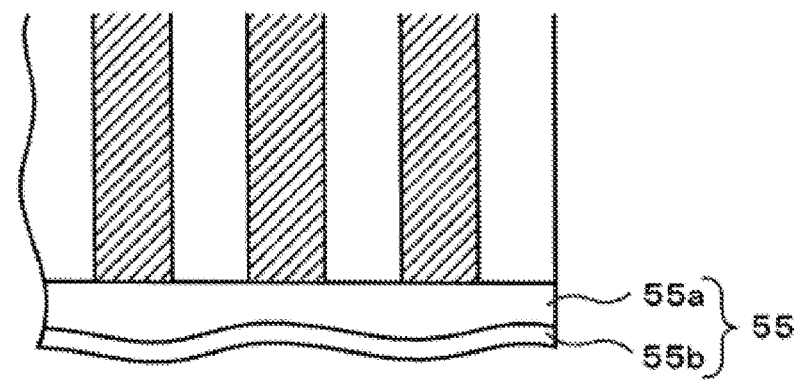
FIG. 9 is a schematic diagram showing the formation of a conductor layer 55.

Next, a conductor layer 55 for serving as the second conductor layer 22 is formed on the back surface of the oxide substrate 46 with an appropriate technique such as physical vapor deposition (PVD). FIG. 9A is a schematic diagram of an example of the conductor layer 55. The conductor layer 55 comprises two metal layers formed in order. The first layer is formed with a film member 55a consisting of an electrically

TABLE 1

|  | | Conditions of Forming Holes | | | | Evaluation | |
| --- | --- | --- | --- | --- | --- | --- | --- |
|  | Solution | Density (mol/l) | Voltage (V) | Temperature (° C.) | Time (h) | Size of Holes (nm) | Mechanical (nm) Strength |
| Conventional Example 1 | Oxalate | 0.1 | 40 | 15 | 18 | 26 | 1.7 no-good |
| Conventional Example 2 | Oxalate | 0.1 | 120 | 12 | 36 | 71 | 4 no-good |
| Conventional Example 3 | Oxalate | 0.5 | 80 | 15 | 24 | 85 | 4.4 no-good |
| Conventional Example 4 | Malonate | 5 | 100 | 12 | 24 | 139 | 4.7 no-good |
| Reference Embodiment 1 | Oxalate | 0.1 | 40 | 8 | 36 | 32 | 5.1 good |
| Reference Embodiment 2 | Oxalate | 0.3 | 40 | 5 | 48 | 72 | 8.3 good |
| Reference Embodiment 3 | Oxalate | 0.5 | 80 | 5 | 48 | 128 | 11 good |
| Reference Embodiment 4 | Malonate | 5 | 150 | 5 | 48 | 209 | 27 good |
| Reference Embodiment 5 | Malonate | 5 | 200 | 2 | 60 | 324 | 36 good |
| Reference Embodiment 6 | Malonate | 5 | 240 | 5 | 72 | 451 | 44 good |
| Reference Embodiment 7 | Phosphate | 0.1 | 200 | 2 | 24 | 339 | 57 good |
| Reference Embodiment 8 | Phosphate | 0.2 | 240 | 2 | 36 | 495 | 74 good |

When the hole diameters are varied as described above, some of the holes may be irregular in shape and may not be circular. Even in such a case, the hole diameters can be measured on a measurement scale fixed in one direction. The variation of the shapes of the holes can produce variation in the shape of the seed layer as shown in portion A and portion B in FIG. 6 and the shape of the conductor layer as shown in portion B in FIG. 9B. Even when the holes are irregular in shape, the variation can be measured by the measuring method described above; and the same effect can be obtained in accordance with the variation. When measuring the hole diameters, it should be noted that a section of a sample be taken perpendicular to the lengthwise direction of the holes. Thirty products are picked up from one production lot by random sampling, and each product is measured for diameters of 30 holes by SEM imaging, so as to calculate the standard deviation.

As described above, the levels of the ends of the first electrodes 25 can be randomly made uneven. In FIGS. 1 and 2, the broken line 27 indicates the level of the end of the shortest one of the plurality of first electrodes 25; the broken line 28 indicates the level of the end of the longest one of the plurality of first electrodes 25; and Ha represents the distance between the broken line 27 and the broken line 28, or the difference in length between the electrodes. The levels of the ends of the first electrodes 25 are made uneven in the range of the distance Ha. The distance Ha should preferably be 1 to 10 μm. The larger variation in conditions of forming the seed layer for each hole (e.g., the areas and thicknesses of the film member 50a covering the holes) increases the distance Ha.

Figure 5E:
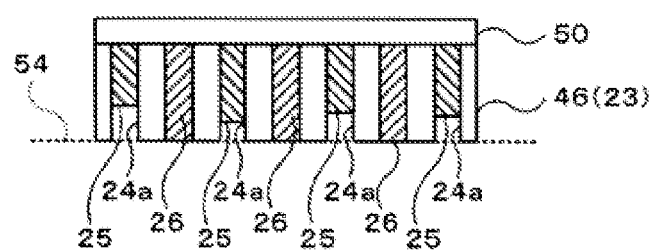

<Step Shown in FIG. 5E>

Next, the back of the oxide substrate 46 is removed along the broken line 54 with an appropriate technique such as chemical-mechanical polishing (CMP), so as to expose the bottom surfaces of the second electrodes 26 on the back of the oxide substrate 46 and to form spaces 24a on the bottom resistive metal such as titanium or chrome, and then the second layer is formed on the first layer with a film member 55b consisting of a metal less electrically resistive than the film member 55a such as copper. The thicknesses of the first layer comprising the film member 55a are varied within the range of about 50 to 300 μm. The conductor layer 55 thus formed varies the electrical resistivity at the end of each hole on the conductor layer 55. In the electrolytic etching on the ends of the plating conductors (the electrodes 26) performed in a later step, electrical current is supplied through the conductor layer 55; therefore, the variation in the electrical resistivity at the end of each hole produces variation in rate of electrolytic etching, thus varying the lengths of the electrodes 26. The thickness of the film member 55a is preferably 300 μm or less, because the first layer with a thickness larger than 300 μm tends to come unstuck.

The thickness of the second layer comprising the film member 55b is about 0.05 to 10 μm.

Figure 9B:
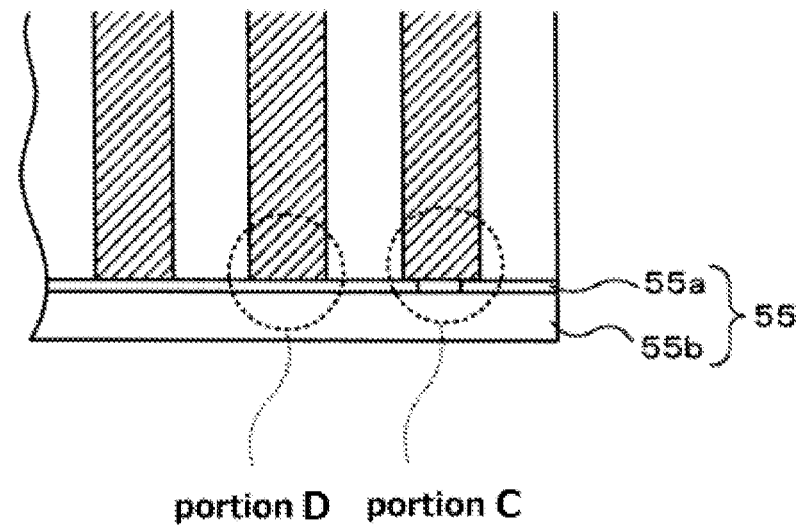

FIG. 9B is a schematic diagram of another example of the conductor layer 55. As shown in this figure, the first layer comprising the film member 55a in thicknesses of about 10 to 200 nm covers the entire ends of some plating conductor electrodes 26 (portion D) and covers a part of the ends of some plating conductor electrodes 26 (portion C); thus, the area of the first layer covering the end of the plating conductor electrode 26 is varied for each hole. Additionally, the preferred thicknesses of the first layer comprising the film member 55a are about 10 to 200 nm, because the first layer in a thickness of less than 10 nm does not work as a conductor layer, while the first layer in a thickness of more than about 200 nm covers the entire ends of all of the plating conductor electrodes 26 as shown in FIG. 9B (portion D).

Then, the second layer is formed on the first layer with the film member 55b into a thickness of about 0.05 to 10 μm. Thus, the conductor layer 55 is formed while retaining the shape of the first layer comprising the film member 55a. The conductor layer 55 is thus formed so as to vary the electrical resistivity at the end of each hole.

The conductor layer 55 is only required to vary the electrical resistivity at the end of each hole; therefore, the conductor layer 55 may be formed in the reverse order of the first layer comprising the film member 55a and the second layer comprising the film member 55b, or the conductor layer 55 may have only the first layer comprising the film member 55a or further have a third layer and a fourth layer in addition to the first and second layers.

Figure 8B:
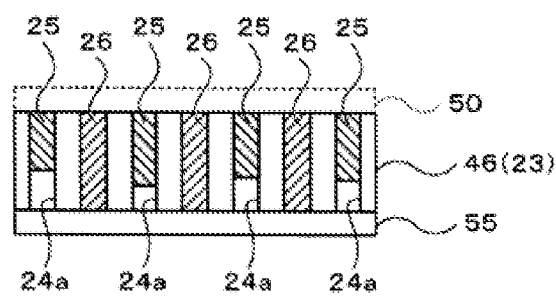

<Step Shown in FIG. 8B>

Next, the seed layer 50 is removed with an appropriate technique such as CMP to expose the top surfaces of the first electrodes 25 and the second electrodes 26 on the front surface of the oxide substrate 46.

Figure 8C:
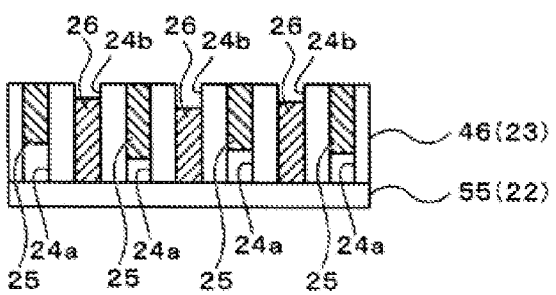

<Step Shown in FIG. 8C>

Next, the lengths of the second electrodes 26 are adjusted by electrolytic etching to form spaces 24b on the top of the second electrodes 26. The electric current for electrolytic etching is uniformly supplied through the conductor layer 55; however, as has already been described with reference to FIG. 9, the first layer of the conductor layer 55 comprising the film member 55a, having a high electrical resistivity, have varied thicknesses and covers the ends of the plating conductor electrodes 26 in varied areas. Therefore, the electrical resistivity at the end of each hole is varied, and thus the end of each of the second electrodes 26 is supplied with varied current density. The ends of the second electrodes 26 provided with lower current density undergo electrolytic etching at a relatively low rate, whereas the ends of the second electrodes 26 provided with higher current density undergo electrolytic etching at a relatively high rate. The electrodes that undergo electrolytic etching at a low rate are finally made longer than those that undergo electrolytic etching at a high rate.

The conductor layer 55 is thus formed so as to vary the electrical resistivity at the end of each hole, thereby varying the levels of the ends of the second electrodes 26 shown in FIG. 8C.

As described above, the levels of the ends of the second electrodes 26 can be randomly made uneven with each other. In FIG. 1, the broken line 30 indicates the level of the end of the shortest one of the plurality of second electrodes 26; the broken line 29 indicates the level of the end of the longest one of the plurality of second electrodes 26; and Hb represents the distance between the broken line 30 and the broken line 29, or the difference in length between the electrodes. The levels of the ends of the second electrodes 26 are made uneven in the range of the distance Hb. The distance Hb should preferably be 1 to 10 μm.

Figure 8D:
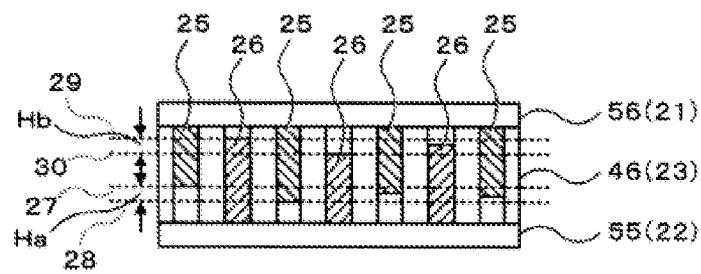

<Step Shown in FIG. 8D>

Finally, a conductor layer 56 for serving as the first conductor layer 21 is formed on the front of the oxide substrate 46 with an appropriate technique such as PVD; lead wires (lead wires 32 and 33 shown in FIG. 2) are provided to the conductor layer 56 (the first conductor layer 21) and the conductor layer 55 (the second conductor layer 22), respectively; and then the entire body is covered with an insulating film (an insulating film 31 shown in FIG. 2). Further, the ends of the lead wires are connected to external electrodes (not shown) disposed outside the insulating film.

Through the above steps, a porous capacitor 20 according to this embodiment is completed, one of the features of which is that the ends of the first electrodes 25 are made uneven with each other within a range of the distance Ha, and the ends of the second electrodes 26 are made uneven with each other within a range of the distance Hb.

In the step of forming the seed layer 50 shown in FIG. 5A, the ends of the first electrodes 25 are made even with each other if the first layer comprising the film member 50a is formed under uniformed conditions (e.g., the area of the film member 50a covering each hole and the thickness of the film member 50a). For example, if the diameter of the holes is about 100 nm, the first layer of the seed layer 50 comprising the film member 50a having a thickness of about 300 nm to 30 μm can be integrally formed so as to close the holes, thereby suppressing the variation in electrical resistivity between the holes. Therefore, in the step shown in FIG. 5D, the ends of the first electrodes 25 are made even with each other. Alternatively, in the step of forming the seed layer 50 shown in FIG. 5A, if the seed layer 50 is integrally formed only of the second layer comprising the film member 50b having a lower electrical resistivity so as to close the holes without forming the first layer comprising the film member 50a, the ends of the first electrodes 25 are made even with each other in the step shown in FIG. 5D.

In the above embodiment, both the ends of the first electrodes 25 and the ends of the second electrodes 26 are made uneven; alternatively, only either one of them may be made uneven depending on the required product reliability and the costs.

Figure 10:
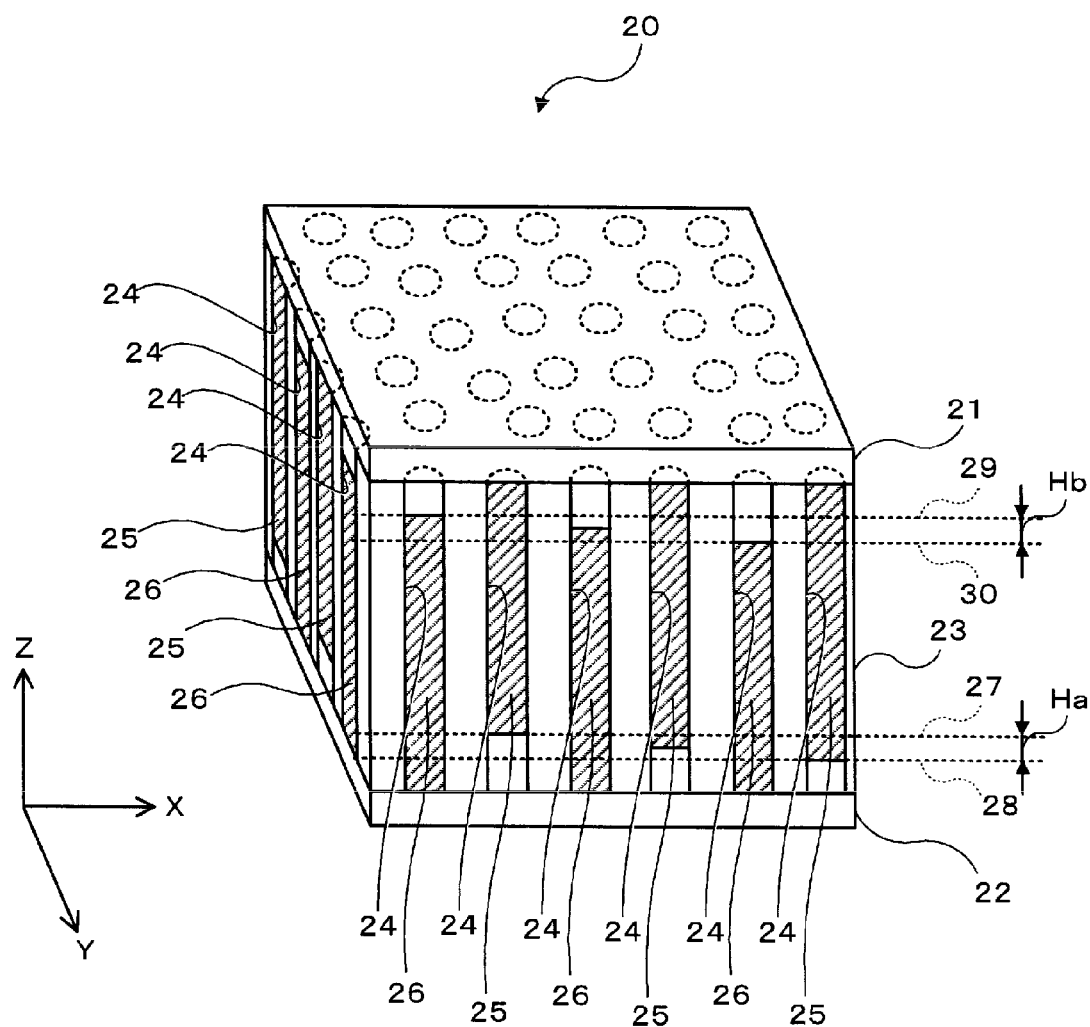
FIG. 10 shows the method of determining the levels of the ends of the electrodes.
Figure 11:
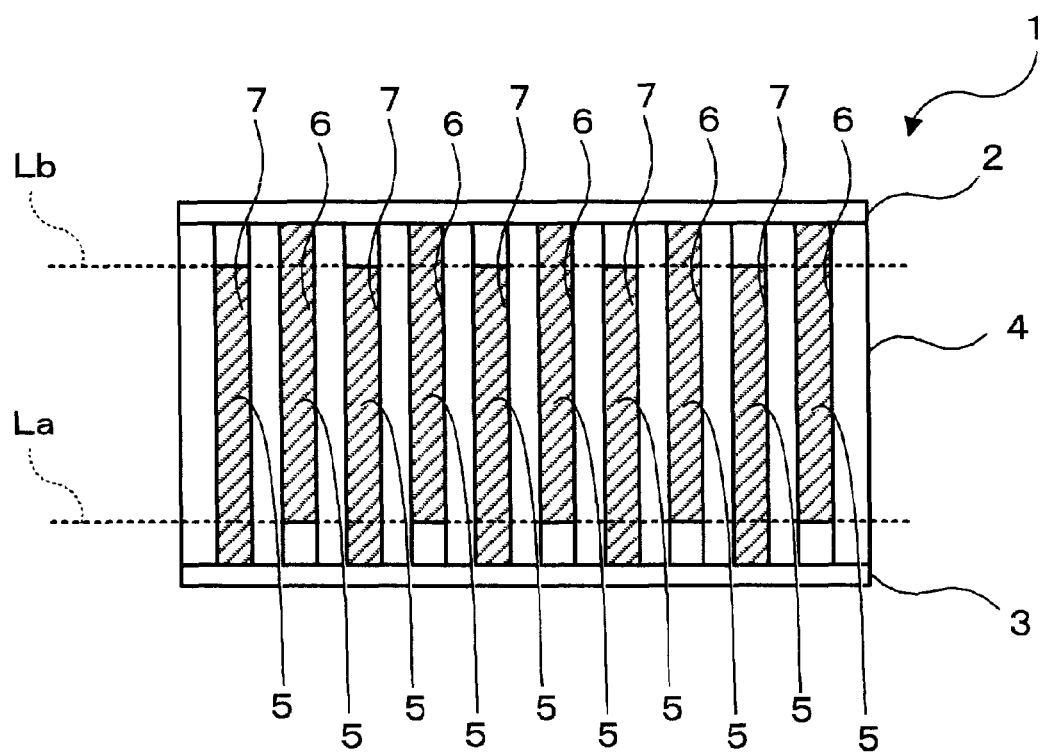
FIG. 11 is a schematic diagram of the porous capacitor of the related art.

The degree of unevenness of the ends of the electrodes can be determined by counting the electrodes observed in sections while grinding the porous capacitor in a direction perpendicular to the lengthwise direction of the electrodes. The ends of the electrodes can be determined as follows. In FIG. 10, take a section of the porous capacitor 20 parallel to the XY plain at the middle in Z direction, and observe the top view of the section. Repeatedly grind a fixed amount of height (about 0.05 μm), while recording the number of the electrodes observed on each grinding after the number of the electrodes observed reaches about 100±10. The grinding level where the number of the electrons observed declines from the peak is the reference lever Continue grinding until no electrode is observed, where the distance from the reference level is Ha.

Perform this operation on five samples for example randomly picked up from the same production lot to obtain five pieces of data; and average the three pieces of data other than the maximum and minimum values to obtain the average distance Ha between the ends of the first electrodes 25. The distance Hb is likewise determined.

The distance Ha (the distance Hb) of 1.00 μm or larger is defined as "unevenness." A heat cycle test was performed on porous capacitors wherein the ends of the electrodes are uneven and porous capacitors wherein the ends of the electrodes are even. On assumption of soldering, the heat cycles included ten cycles, each involving a temperature rise from a room temperature to 320° C. and then a temperature fall back to the room temperature. The porous capacitors subjected to the heat cycles were examined for the presence of a crack under a microscope magnifying 50 to 100 times. Ten test samples were examined for each determination; and if one or more of the test samples had a crack, the capacitors were determined to be "no-good." The distances Ha and Hb were determined by the above method including grinding. The capacitors used for the heat cycle test were in the same production lot as the samples used for determining the distances. Additionally, no mutual effect was observed between the distances Ha and Hb in the results of the heat cycle test (occurrence of cracking). Therefore, the test was performed based on the fact that the distances Ha and Hb are mutually independent. The test results are listed in Table 2.

TABLE 2

| | Number of Cracked Samples After Heat Cycles (Cracked Samples/Samples) | Determination |
|---|---|---|
| Ha(μm) | | |
| 0.46 | 7/10 | no-good |
| 0.63 | 5/10 | no-good |
| 0.82 | 2/10 | no-good |
| 0.93 | 1/10 | no-good |
| 0.99 | 0/10 | good |
| 1.02 | 0/10 | good |
| 1.21 | 0/10 | good |
| 1.29 | 0/10 | good |
| 1.54 | 0/10 | good |
| 1.89 | 0/10 | good |
| 2.40 | 0/10 | good |
| Hb(μm) | | |
| 0.53 | 5/10 | no-good |
| 0.69 | 4/10 | no-good |
| 0.82 | 3/10 | no-good |
| 0.90 | 1/10 | no-good |
| 0.98 | 0/10 | good |
| 1.00 | 0/10 | good |
| 1.11 | 0/10 | good |
| 1.25 | 0/10 | good |
| 1.53 | 0/10 | good |
| 1.87 | 0/10 | good |
| 2.22 | 0/10 | good |

As shown in Table 2, no crack occurred in the heat cycle tests when the distance Ha and the distance Hb are 1 μm or larger.

What is claimed is:

1. A porous capacitor comprising:
   a first conductor layer;
   a second conductor layer opposed to the first conductor layer at a certain distance;
   a dielectric layer disposed between the first conductor layer and the second conductor layer, the dielectric layer being made of an oxidized valve metal and having a large number of holes substantially orthogonal to the first conductor layer and the second conductor layer;
   first electrodes made of a conductive material filled in at least part of the large number of holes, the first electrodes being electrically connected to the first conductor layer and insulated from the second conductor layer via void spaces between insulated ends of the first electrode and the second conductor layer, with levels of the insulated ends of the first electrodes being uneven with each other within a certain range; and
   second electrodes made of a conductive material filled in at least part of the large number of holes, the second electrodes being electrically connected to the second conductor layer and insulated from the first conductor layer,
   wherein the first conductor layer is configured to vary an electrical resistivity at the end of each of the holes on the first conductor layer.

2. The porous capacitor of claim 1, wherein the second electrodes are insulated from the first conductor layer via void spaces between insulated ends of the second electrode and the first conductor layer, with levels of the insulated ends of the second electrodes being uneven with each other within a certain range.

3. The porous capacitor of claim 1, wherein the first conductor layer comprises a first film member and a second film member, the first film member is located on a side of the dielectric layer and a second film member is not in direct contact with the dielectric layer, the electrical resistivity of the second film member is lower than the electrical resistivity of the first film member, and the first film member is formed so as to vary the electrical resistivity at the end of each of the holes on the first conductor layer.

4. The porous capacitor of claim 3, wherein the first film member covers the holes in varied areas.

5. The porous capacitor of claim 3, wherein the first film member is formed with varied thicknesses.

* * * * *